United States Patent [19]

Terreault

[11] Patent Number: 6,058,292
[45] Date of Patent: *May 2, 2000

[54] INTEGRATED TRANSMITTER/RECEIVER APPARATUS (MONOLITHIC INTEGRATION CAPABILITIES)

[75] Inventor: Gérard Terreault, Pierrefonds, Canada

[73] Assignee: Consultic Consultant en Gestion et Informatique Inc., Anjou, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/744,922

[22] Filed: Nov. 6, 1996

[51] Int. Cl.⁷ .................................................. H04B 1/44
[52] U.S. Cl. .............................. 455/78; 455/84; 455/574
[58] Field of Search .................................... 370/296, 278, 370/282; 455/78, 82–86, 550, 574, 575, 343, 127; 330/254, 278, 295, 133, 255, 261

[56] References Cited

U.S. PATENT DOCUMENTS

| | | |
|---|---|---|
| 3,988,675 | 10/1976 | Dykas ........................................ 455/78 |
| 4,194,153 | 3/1980 | Masaki et al. ........................... 455/343 |
| 4,290,026 | 9/1981 | Shoji ....................................... 330/255 |
| 5,146,613 | 9/1992 | Anderson .................................. 455/78 |
| 5,251,331 | 10/1993 | Schwent et al. ......................... 455/127 |
| 5,390,357 | 2/1995 | Nobusawa et al. ...................... 455/343 |
| 5,515,036 | 5/1996 | Waraksa .................................. 455/127 |

Primary Examiner—Nguyen Vo
Attorney, Agent, or Firm—Alix, Yale & Ristas, LLP

[57] ABSTRACT

A radio transceiver having a receive mode and transmit mode is disclosed. The transceiver makes use of an application controller to control the operation of the transmitter and receiver portions of the transceiver. The application controller enables the control of a voltage source connected to the transmitter portion to vary the amplification gain of the transmitter section. The output of the transmitter and the input of the receiver are connected directly to the antenna circuit without the use of a duplexer. An oscillator circuit provides a transmission carrier during transmission and is used to convert signal frequency during reception of a signal. The controller can switch between the transmitting and receiving functions by activating and de-activating either one of the transmitter and receiver sections of the radio transceiver.

11 Claims, 2 Drawing Sheets

INTEGRATED TRANSMITTER/RECEIVER APPARATUS (MONOLITHIC INTEGRATION CAPABILITIES)

SUMMARY OF THE INVENTION

This invention relates to transceiver designs but more particularly to a transceiver design which reduces the number of duplicate elements shared by the transmitter and receiver portions of the transceiver to facilitate integration thereof.

BACKGROUND OF THE INVENTION

In an effort to modernize residential, commercial and industrial buildings, lighting, heating and various other systems are being installed with multiple sensors capable of communicating with a central controller in response to a predetermine command. For example, smart controls are being installed in homes to manage energy utilization. This is achieved by controlling for example, heating, air conditioning and ventilation systems using a single controller. The control of these systems is done using a number of transducers located around the house to permit the controller to properly manage the systems in an efficient manner.

Generally, the various components of these systems are connected to the controller using wires pre-installed during construction of the house or sometime thereafter. Obviously, there are limitations associated with wiring a house after it is built. This can create problems when the components need to be moved or re-located. Some systems will utilize existing house 120VAC wiring to control devices at a number of locations in the house. For example, to turn lamps on and off.

Wireless systems are now available which utilize low power communication to control remotely located components. However, most of these are only able to offer unidirectional communication because of the costs involved in providing a reverse channel. This cost is a result of the need to provide duplicate components for the transmitter and receiver sections of the transducer.

Normally, a transceiver makes use of a transmitter and a receiver circuit and a switch or duplexer connecting the transmitter and receiver circuit to an antenna for transmission or reception of a signal. The transmitter and receiver each includes input and output filters. These filters and the duplexer are generally passive elements which are relatively costly to assemble.

Efforts have been made to reduce the number of components to facilitate integration. For example, U.S. Pat. No. 5,355,524 which issued to Higgins teaches a radio design architecture which facilitates integration by elimination of certain filtering elements. However, Higgins' circuit design still requires the use of a Transmit/Receive switch 208 or duplexer to switch the transceiver from a receive mode to a transmit mode and vice-versa.

A need therefore exists for a transceiver circuit design which further reduces the number of components while remaining suitable for integration as an integrated circuit.

Accordingly, it is an object of the present invention to provide a radio transceiver which is designed such that the transmitter and receiver sections of the transceiver share a number of components.

Another object of the present invention, is to provide a radio transceiver which is designed to facilitate monolithic integration of its components.

In accordance with another object of the present invention, there is provided a radio transceiver which is designed to reduce the number of components and manufacturing costs while offering bi-directional communication.

According to an aspect of the present invention, there is provided a radio transceiver having a receive mode and a transmit mode, said radio transceiver comprising:

transmitter means having an output thereof for connection to an antenna circuit to transmit a signal when said radio transceiver is in a transmit mode;

receiver means having an input thereof for connection to said antenna circuit to receive a signal when said radio transceiver is in a receive mode;

first means for activating and de-activating said transmitter means;

second means for activating and de-activating said receiver means; and control means connected to said first and second activating and de-activating means such that when said radio transceiver is in said receive mode, said first means, responsive to said control means, de-activates said transmitter means and said second means, responsive to said control means, activates said receiver means and when said radio transceiver is in said transmit mode, said first means responsive to said control means activates said transmitter means and said second means, responsive to said control means de-activates said receiver means.

BRIEF DESCRIPTION OF THE DRAWINGS

The invention will be better understood by an examination of the following description, together with the accompanying drawings, in which.

DESCRIPTION OF THE PREFERRED EMBODIMENTS

Figure 1:
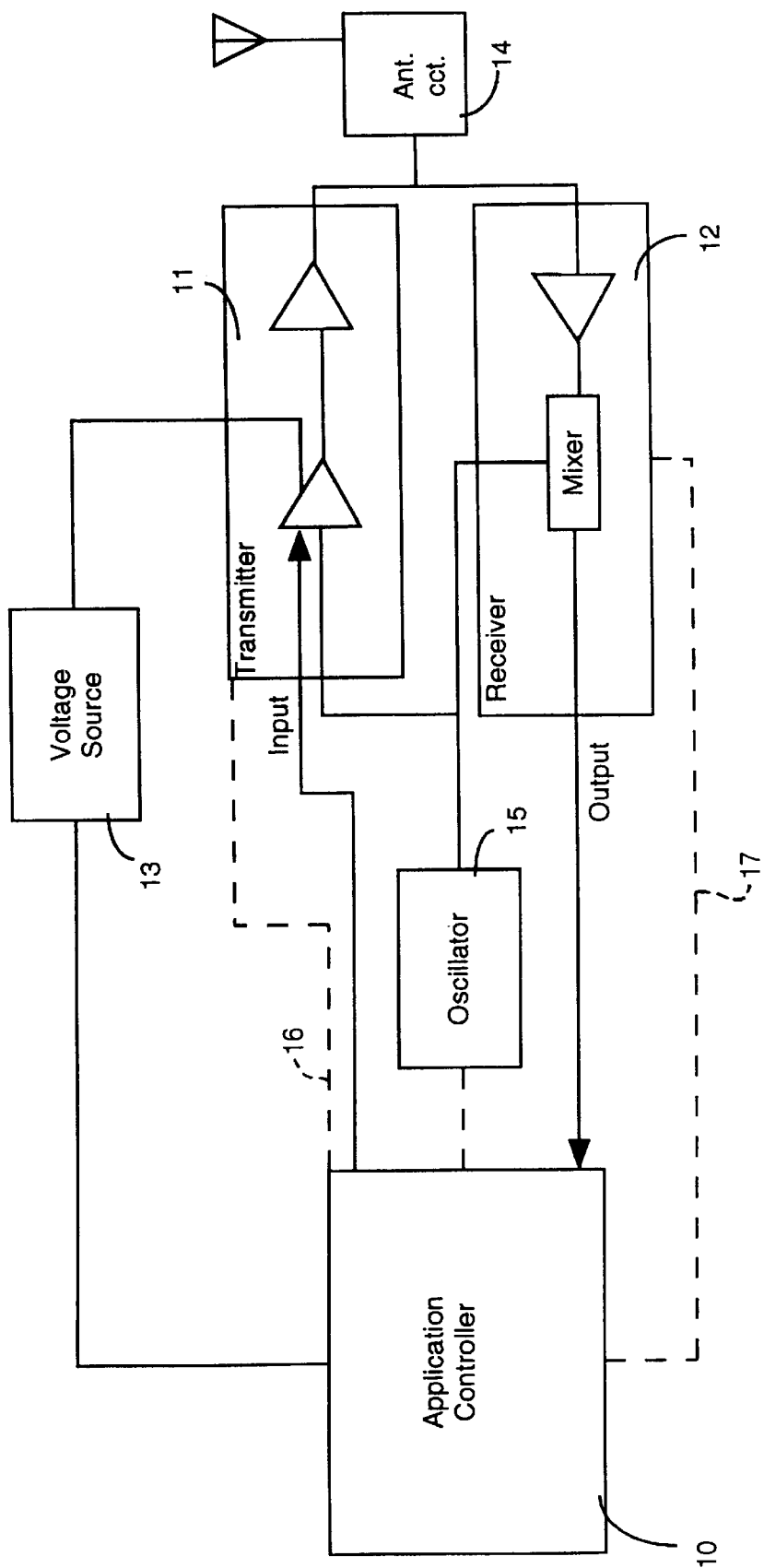
FIG. 1 is a block diagram of the radio transceiver of the present invention.

Referring now to FIG. 1, we have shown the basic components forming part of the radio transceiver of the present invention.

The transceiver makes use of an application controller 10 to control the operation of the transmitter 11 and receiver 12. The application controller 10 also controls a voltage source 13 which is used to vary the amplification gain of the transmitter 11.

The output of transmitter 11 and the input of receiver 12 are directly connected to antenna circuit 14 without the use of a duplexer. The oscillator circuit 15 provides a transmission carrier during the transmission mode and is used to convert signal frequency during reception of a signal. The controller 10 can switch between the transmitting and receiving functions by activating and deactivating either of the transmitter or receiver sections using control links 16 and 17, respectively.

Figure 2:
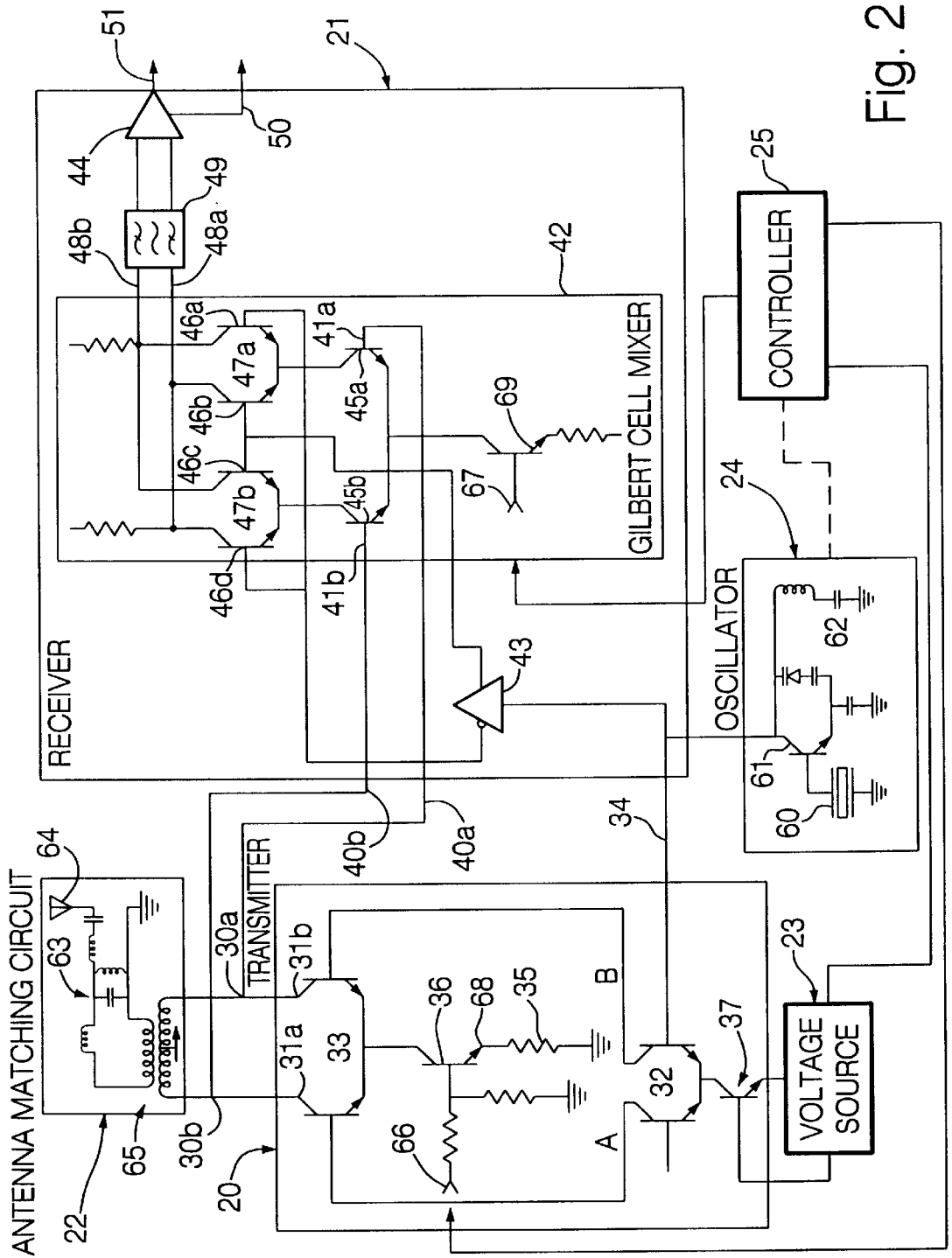
FIG. 2 is a more detailed block diagram illustrating the relationship between the various transceiver components.

Referring now to FIG. 2, we have shown a general schematic diagram of the transceiver of the present invention. In the embodiment shown in FIG. 2, the transmitter section is identified by block 20, the receiver section by block 21, the antenna circuit by block 22, the voltage source by block 23 and the oscillator circuit is represented by block 24. The functional details of application controller 25 when used in association with the transceiver of the present invention will be understood to those knowledgeable in the art and need not be described further.

As shown in FIG. 2, the bi-polar outputs 30a and 30b of the transmitter 20 are formed at the collectors 31a and 31b, respectively, of a pair of transistors connected to form a differential amplifier. The inputs 40a and 40b of the receiver 21 are formed at the bases of a pair of transistors 41a and 41b to form a differential amplifier. Thus, the inputs 40a and 40b of receiver 21 and the outputs 30a and 30b of transmitter 20 are connected directly to antenna circuit 22.

In the transmitter section 20, the signal from the oscillator 24 is fed to a first differential amplifier 32. This differential amplifier has three functions, namely, first it generates differential signals A and B for use by the output amplifier 33. These are based on the unipolar signal generated by the oscillator output 34. Second, it provides a variable amplitude signal to the output amplifier 33 to vary the transmitter's output power or gain according to the quality of the transmission channel. The transmitter's gain is controlled by varying the voltage at the voltage source 23. This is done by means of an electronic potentiometer (not shown). When the transmitter is not required to transmit, control circuit 25 blocks amplifier 32 to isolate the transmitter 20 and minimize undesired transmissions. The transmitter's output amplifier 33 comprises differential inputs and outputs. It is turned on for transmission and off for the non-transmission period of the transceiver. This control is also applied for the on/off keying modulation. The resistance 35 of the emitter of transistor 36 is set according to the application to determine the output power range of the transmitter.

Since the transmitter 20 makes use of cascading differential amplifiers, the transmitter output gain can be varied by varying the amplitude of the voltage at the current source 37 of the differential amplifier. This functionality can be useful during communication such that if a first transmission, initially at low power, is not received, the output power can be increased to try to re-establish a connection. The range of variation which can be achieved is of the order 20–30 dB. In addition, the range can be stepped up or down by preselecting the resistor value 35 to a suitable impedance level. This way, the transmission power can be varied to meet the requirements of various applications for which the transceiver is used. These applications will have different transmission distance requirements as well as different transmission parameters. In addition, the use of differential amplifiers facilitates integration of the circuit into a monolithic IC.

The receiver section 21 is comprised of three main elements, namely, a mixer 42, a buffered differential amplifier 43, and a limiting amplifier 44. The mixer 42 is of the Gilbert cell-type. It is placed at the input of the receiver 21 to mix the differential inputs 40a and 40b of the receiver 21 and the output 34 of oscillator 24. The inputs 40a and 40b are applied at the bases 41a and 41b, respectively of the differential amplifier pair 45a and 45b whereas the output of the oscillator 24 is applied to the bases 46a, 46b, 46c and 46d of the differential amplifiers 47a and 47b, respectively. A buffered differential amplifier 43 transforms the unipolar output 34 of the oscillator 24 into a differential signal for input into the Gilbert cell 42. It will minimize parasitic transmissions when the receiver 21 is not operational. The signals at the output of the Gilbert cell 48a and 48b are filtered by means of active filter 49 to retain only the low frequency signal desired, typically between 20–500 kHz. A limiting logarithmic amplifier 44 provides two types of signals depending on the application. On one hand the logarithmic signal of the Received Signal Strength Indicator (RSSI) level is used for the on/off keying modulation 50. At the other output 51 an FM/FSK modulated signal is provided. A comparator of the RSSI signal (not shown) can be used to detect on/off keying signal reception. Similarly, a discriminator (not shown) can also be used to demodulate the FM/FSK signal at output 51.

The oscillator circuit 24 is used to provide a transmission carrier as well as a local oscillator for converting signal frequency on reception. The oscillator 24 makes use of a SAW (Surface Acoustic Wave) resonator 60 connected to a transistor 61 and an LC resonant circuit 62 able to vary the resonant frequency of the circuit. The oscillating frequency can thus be extended between the transmission and reception frequencies. Alternately, a SAW circuit with two resident frequencies can be used with two outputs feeding the transmitter and receiver sections of the transceiver.

Antenna circuit 22 comprises a single filter 63 connected to antenna 64. A center tap transformer 65 is used to match the transmitter outputs 30a and 30b to the antenna impedance. The antenna circuit 22 is thus connected on one hand to the collector portions 31 of the transmitter circuit 20 and on the other hand to the base portions 41a and 41b of transistors 45a and 45b of receiver 21. If the transceiver is designed to be built into an integrated circuit, the antenna circuit elements will normally be external to the integrated circuit and will be selected by the end user to meet three functions. First, the antenna filter is designed according to the bandpass region around the transmission frequency; second, a power input to the output amplifier of the transmitter is realized by the transformer 65; and third, the creation of an impedance matching circuit to the unipolar or bipolar antenna.

The switching between the transmitter and receiver function is done by having control circuit 25 activate either one of differential amplifiers inputs 66 or 67. That is, the circuits are activated and deactivated depending on whether or not the emitters 68 and 69 of the pair of differential transistors of transmitter 20 and receiver 22, respectively, are biased. This way, the duplexer and one of two filters normally required are eliminated. Preferably, the signal modulation is in the form of on/off keying in half duplex since the transmission frequency is the same in two directions and makes use of the same filter for the input and output circuit. The circuit can also be designed to be used with FM or FSK modulation or with a different frequency between the transmission and reception if the two frequencies are within the bandpass region of the antenna filter.

From the foregoing, it is evident that there are a number of ways in which the transmitter and receiver sections can be activated and de-activated to eliminate the need for a separate duplex or antenna. Variations of the particular embodiment herewith described will be obvious to one skilled in the art, and accordingly the embodiment is to be taken as illustrative rather than limitive, the true scope of the invention being set out in the appended claims.

What is claimed is:

1. A radio transceiver having a receive mode and a transmit mode, said radio transceiver comprising:

transmitter means having an output thereof for connection to an antenna circuit to transmit a signal when said radio transceiver is in said transmit mode, receiver means having an input thereof for connection to said antenna circuit to receive a signal when said radio transceiver is in said receive mode;

first means for activating and de-activating said transmitter means, said first means including a controllable voltage source, said transmitter means having power level controlled by a voltage of the voltage source;

transistor means for activating and de-activating said receiver means; and control means connected to said first means and transistor means such that:

when said radio transceiver is in said receive mode, said first means, responsive to said control means, de-activates said transmitter means and said transistor means, responsive to said control means, activates said receiver means; and when said radio transceiver is in transmit mode, said first means, responsive to said control means, activates said transmitter means and said transistor means, responsive to said control means de-activates said receiver means.

2. A radio transceiver as defined in claim 1, wherein said transmitter means comprises a first differential amplifier wherein the output of the differential amplifier is directly connected to said antenna circuit.

3. A radio transceiver as defined in claim 2, wherein said transmitter means is further comprised of a second differential amplifier connected in cascade with said first differential amplifier such that by varying the output gain of said second differential amplifier, the output of said first differential amplifier and the output of said transmitter means can be varied.

4. A radio transceiver as defined in claim 3, wherein said receiver means and said transmitter means share a common oscillator.

5. A radio transceiver as defined in claim 2, wherein said receiver means comprises a second differential amplifier having an input thereof connected directly to said antenna circuit to form the input of said receiver means.

6. A radio transceiver as defined in claim 5, wherein said receiver means comprises a buffered differential amplifier connected between an oscillator and said second differential amplifier, said oscillator being directly connected to said first differential amplifier.

7. A radio transceiver as defined in claim 5, wherein said first means and transistor means is connected to said first and second differential amplifiers respectively such that said receiver and transmitter means can be controlled by turning on and off said differential amplifiers.

8. A radio transceiver as defined in claim 7, wherein said transistor means for activating and de-activating said receiver means comprises a differential transistor responsive to said control means.

9. A radio transceiver as defined in claim 7, wherein said receiver means and said transmitter means share a common oscillator.

10. A radio transceiver as defined in claim 1, wherein said receiver means in further comprised of an input mixer and said transistor means controls the input of said receiver means by the activation and de-activation of said input mixer.

11. A radio transceiver as defined in claim 1, wherein said receiver means and said transmitter means share a common oscillator.

* * * * *